(12) United States Patent
Cheng et al.

(10) Patent No.: US 10,176,213 B2
(45) Date of Patent: Jan. 8, 2019

(54) METHOD AND DEVICE FOR VERIFYING CONSISTENCY OF DATA OF MASTER DEVICE AND SLAVE DEVICE

(71) Applicant: TENCENT TECHNOLOGY (SHENZHEN) COMPANY LIMITED, Shenzhen, Guangdong (CN)

(72) Inventors: Bin Cheng, Shenzhen (CN); Zhiyang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 737 days.

(21) Appl. No.: 14/792,841

(22) Filed: Jul. 7, 2015

(65) Prior Publication Data
US 2015/0317351 A1 Nov. 5, 2015

Related U.S. Application Data

(63) Continuation of application No. PCT/CN2014/070403, filed on Jan. 9, 2014.

(30) Foreign Application Priority Data

Jan. 11, 2013 (CN) .......................... 2013 1 0011244

(51) Int. Cl.
*G06F 17/30* (2006.01)
*G06F 11/14* (2006.01)

(52) U.S. Cl.
CPC .... *G06F 17/30371* (2013.01); *G06F 11/1446* (2013.01); *G06F 17/30368* (2013.01); *G06F 17/30578* (2013.01); *G06F 17/30581* (2013.01)

(58) Field of Classification Search
CPC combination set(s) only.
See application file for complete search history.

(56) References Cited

U.S. PATENT DOCUMENTS 7,680,876 B1 * 3/2010 Cioli ................... G06F 11/1662
  709/201
8,140,772 B1  3/2012 Yang
(Continued)

FOREIGN PATENT DOCUMENTS

CN  101055538 A  10/2007
CN  102203779 A   9/2011
(Continued)

OTHER PUBLICATIONS

International Search Report of PCT/CN2014/070403 dated Apr. 16, 2014.
(Continued)

*Primary Examiner* — Syling Yen
*Assistant Examiner* — Bao G Tran
(74) *Attorney, Agent, or Firm* — Sughrue Mion, PLLC (57) ABSTRACT

Disclosed is a method and device for verifying consistency of data of a master device and a slave device. The method comprises: acquiring first data of the master device and the slave device, respectively, each first data comprising a data file of a checkpoint and a log file; recovering data according to received first data of the master device and the slave device respectively to acquire second data of the master device and the slave device, each second data being data recovered according to data file of the checkpoint and the log file; generating third data of the master device and the slave device according to the second data of the master device and the slave device, each third data comprising second data and primary keys and characteristic values of second data;
(Continued)

comparing third data of the master device with third data of the slave device; and outputting verification results.

10 Claims, 4 Drawing Sheets

(56) References Cited

U.S. PATENT DOCUMENTS

| | | | |
|---|---|---|---|
| 2003/0167331 A1* | 9/2003 | Kumar | G06F 11/1464 709/227 |
| 2006/0173850 A1* | 8/2006 | Auer | G06F 17/30356 |
| 2007/0276983 A1* | 11/2007 | Zohar | G06F 3/0607 711/100 |
| 2008/0140734 A1 | 6/2008 | Wagner | |
| 2009/0037550 A1 | 2/2009 | Mishra et al. | |
| 2009/0187609 A1* | 7/2009 | Barton | G06F 11/1464 |
| 2012/0023067 A1* | 1/2012 | Clegg | G06F 17/30575 707/634 |
| 2012/0151273 A1* | 6/2012 | Ben Or | G06F 9/45533 714/41 |

FOREIGN PATENT DOCUMENTS

| | | |
|---|---|---|
| CN | 102841897 A | 12/2012 |
| JP | 2009252149 A | 10/2009 |

OTHER PUBLICATIONS

Communication dated Jul. 12, 2017, from the State Intellectual Property Office of People's Republic of China in counterpart Application No. 201310011244.5

* cited by examiner

METHOD AND DEVICE FOR VERIFYING CONSISTENCY OF DATA OF MASTER DEVICE AND SLAVE DEVICE

This application is a continuation of International Application No. PCT/CN2014/070403, filed on Jan. 9, 2014, which claims priority to Chinese patent application No. 201310011244.5, filed on Jan. 11, 2013, the content of which are incorporated herein by reference in their entirety.

FIELD

The present disclosure relates to the computer field, particularly to a method and device for verifying consistency of data of a master device and a slave device.

BACKGROUND

As an important part of the modern information science & technology and a core of computer data processing and information management systems, database technology allows effective organization and storage of mass data during the computer information processing. Use of the database technology may reduce data storage redundancy, realize data sharing, ensure data security, and efficiently retrieve and process data. To ensure the security of important data in a database of certain equipment, a mechanism of master-slave devices may be employed so that data backup for the database of the master device may be accomplished in the slave device. Because the long-time running of the master device may result in the inconsistency of data in both the master device and the slave device, it is very important to verify the consistency of data in both the master device and the slave device.

During the consistency verification of data in a master device and a slave device, the characteristic values of data in both the master device and the slave device are acquired from the master device and the slave device by commands (for example, by a checksum table) in the structured query language, and then the characteristic values of the master device and the slave device are compared with each other to find whether they are identical. If identical, it is determined that data in both the master device and the slave device are consistent; and if not, data in both the master device and the slave device are inconsistent.

The above verification process implements consistency verification by a great number of commands in the structured query language, this will result in lots of read/write operations to a disk and occupy more system resources, thus it is disadvantageous for the master device to process services in real time; in addition, it can be determined only whether the data in both the master device and the slave device are consistent by comparison, and the specific inconsistent data cannot be found, so the accuracy of verification is poor.

SUMMARY

To solve the problems on occupancy of resources and poor accuracy of verification during the data verification, the embodiments of the present disclosure provide a method and device for verifying consistency of data of a master device and a slave device. The technical solutions are as follows.

On one hand, a method for verifying consistency of data of a master device and a slave device is provided, comprising the following steps of:

acquiring first data of the master device and first data of the slave device, respectively, each first data comprising a data file of a checkpoint and a log file;

recovering data according to the received first data of the master device and the received first data of the slave device respectively to acquire second data of the master device and second data of the slave device, each second data being data recovered according to the data file of the checkpoint and the log file;

generating third data of the master device and third data of the slave device according to the second data of the master device and the second data of the slave device, each third data comprising the second data and at least one primary key and characteristic values of the second data;

comparing the third data of the master device with the third data of the slave device, and outputting verification results.

Acquiring first data of the master device and first data of the slave device respectively comprises the following steps of:

sending, to the master device and the slave device, a control command carrying a transmission rate at which the master device and the slave device send the first data, respectively; and receiving the first data sent by the master device and the first data sent by the slave device.

The first data further comprises a disk read/write parameter; and correspondingly, sending, to the master device and the slave device, a control command carrying a transmission rate at which the master device and the slave device send the first data, respectively, comprises the following steps of:

adjusting the transmission rate according to the disk read/write parameter, and sending, to the master device and the slave device, the control command carrying the adjusted transmission rate at which the master device continues to send the first data of the master device and the slave device continues to send the first data of the slave device.

Generating third data of the master device and third data of the slave device according to the second data of the master device and the second data of the slave device comprises the following step of:

traversing each row of the second data of the master device to extract the primary keys in the second data of the master device and calculating the characteristic value of each row of the second data of the master device according to the second data of the master device; and traversing each row of the second data of the slave device to extract the primary keys in the second data of the slave device and calculating the characteristic value of each row of the second data of the slave device according to the second data of the slave device.

Comparing the third data of the master device with the third data of the slave device and outputting verification results comprise the following steps of:

determining whether the primary keys of corresponding row data in the third data of the master device and the third data of the slave device are identical;

outputting the corresponding row data of both the master device and the slave device, respectively, if the primary keys of the corresponding row data in the third data of the master device and the third data of the slave device are identical and if the characteristic values of the corresponding row data of both the master device and the slave device are different; and determining whether the primary key of the corresponding row data in the third data of the master device is greater than that of the corresponding row data in the third data of the slave device if the primary keys of the corresponding row data in the third data of the master device and the third data of the slave device are different; outputting the corresponding row data in the third data of the slave device if the primary key of the corresponding row data in the third data of the master device is greater than that of the corresponding row data in the third data of the slave device; and outputting the corresponding row data in the third data of the master device if the primary key of the corresponding row data in the third data of the master device is less than that of the corresponding row data in the third data of the slave device.

On the other hand, a device for verifying consistency of data of a master device and a slave device, comprising:

a first acquisition module, configured to acquire first data of the master device and first data of the slave device, respectively, each first data comprising a data file of a checkpoint and a log file;

a second acquisition module, configured to recover data according to the received first data of the master device and the received first data of the slave device respectively to acquire second data of the master device and second data of the slave device, each second data being data recovered according to the data file of the checkpoint and the log file;

a third acquisition module, configured to generate third data of the master device and third data of the slave device according to the second data of the master device and the second data of the slave device, each third data comprising the second data and at least one primary key and characteristic values of the second data;

a comparison module, configured to compare the third data of the master device with the third data of the slave device to output verification results; and an output module, configured to output verification results.

The first acquisition module comprises:

a sending unit, configured to send, to the master device and the slave device, a control command carrying a transmission rate at which the master device and the slave device send the first data, respectively; and a receiving unit, configured to receive the first data sent by the master device and the first data sent by the slave device.

The first data further comprises a disk read/write parameter; and correspondingly, the sending unit is further configured to adjust the transmission rate according to the disk read/write parameter, and send to the master device and the slave device the control command carrying the adjusted transmission rate at which the master device continues to send the first data of the master device and the slave device continues to send the first data of the slave device.

The third acquisition module is configured to traverse each row of the second data of the master device to extract the primary keys in the second data of the master device and calculate the characteristic value of each row of the second data of the master device according to the second data of the master device; and the third acquisition module is further configured to traverse each row of the second data of the slave device to extract the primary keys in the second data of the slave device and calculate the characteristic value of each row of the second data of the slave device according to the second data of the slave device.

The comparison module comprises:

a judgment unit, configured to determine whether the primary keys of corresponding row data in the third data of the master device and the third data of the slave device are identical; and an output unit, configured to output the corresponding row data of both the master device and the slave device, respectively, if the primary keys of corresponding row data in the third data of the master device and the third data of the slave device are identical and if the characteristic values of the corresponding row data in the third data of both the master device and the slave device are different;

the judgment unit is further configured to determine whether the primary key of the corresponding row data in the third data of the master device is greater than that of the corresponding row data in the third data of the slave device if the primary keys of the corresponding row data in the third data of the master device and the third data of the slave device are different; and the output unit is further configured to output the corresponding row data in the third data of the slave device if the primary key of the corresponding row data in the third data of the master device is greater than that of the corresponding row data in the third data of the slave device, and output the corresponding row data in the third data of the master device if the primary key of the corresponding row data in the third data of the master device is less than that of the corresponding row data in the third data of the slave device.

The technical solutions provided by the embodiments of the present disclosure have the following advantages:

by the method and device for verifying consistency of data of a master device and a slave device provided by the embodiments of the present disclosure, first data of the master device and first data of the slave device are acquired, each first data comprising a data file of a checkpoint and a log file; data is recovered according to the received first data of the master device and the received first data of the slave device to acquire second data of the master device and second data of the slave device, each second data being data recovered according to the data file of the checkpoint and the log file; third data of the master device and third data of the slave device are generated according to the second data of the master device and the second data of the slave device, each third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved.

BRIEF DESCRIPTION OF THE DRAWINGS

To describe the technical solutions in the embodiments of the present disclosure more clearly, the accompanying drawings to be used for describing the embodiments will be briefly introduced as below. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objects, technical solutions and advantages of the present disclosure clearer, the implementation ways of the present disclosure will be further described as below in details with reference to the accompanying drawings.

Figure 1A:
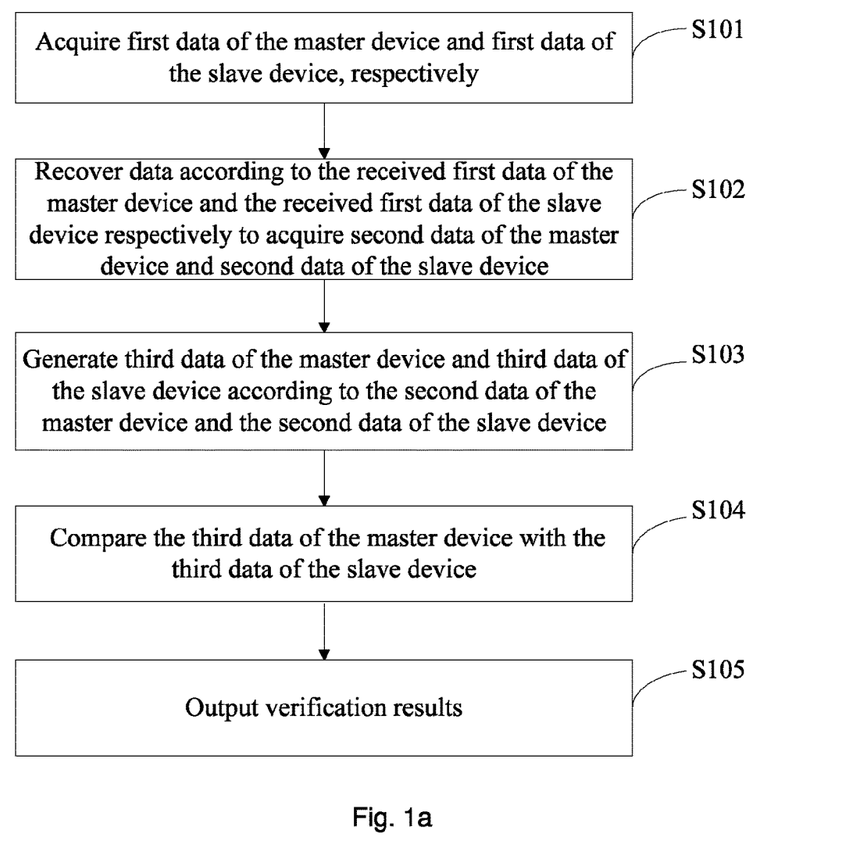
FIG. 1a is a flowchart of a method for verifying consistency of data of a master device and a slave device according to embodiments of the present disclosure.

FIG. 1a is flowchart of a method for verifying consistency of data of a master device and a slave device according to embodiments of the present disclosure. The executive subject in the embodiments of the present disclosure is a device with verification function (hereinafter referred to as device). Referring to FIG. 1a, the method comprises the following steps:

S101: First data of the master device and first data of the slave device are acquired, respectively, each first data comprising a data file of a checkpoint and a log file.

In the embodiments of the present disclosure, the device acquires first data of the master device and first data of the slave device, respectively.

Wherein, the checkpoint is a database event for synchronizing the modified data in a memory to a data file on a disk, and the checkpoint provides a mechanism of ensuring the consistency of transaction data modification.

Wherein, the data file of the checkpoint refers to a data file of a checkpoint nearest to the current moment, and the log file is used for recording all operations in the equipment after the checkpoint nearest to the current moment.

S102: Data is recovered according to the received first data of the master device and the received first data of the slave device to acquire second data of the master device and second data of the slave device, each second data being data recovered according to the data file of the checkpoint and the log file.

After receiving the first data sent by the master device and the first data sent by the slave device, the device performs data recovery to the data file of the checkpoint according to the log file of the master device to generate the second data of the master device. The second data of the master device is data obtained after the operation recorded in the log file is performed to the data file of the master device.

Meanwhile, the device performs data recovery to the data file of the checkpoint according to the log file of the slave device to generate the second data of the slave device. The second data of the slave device is data obtained after the operation recorded in the log file is performed to the data file of the slave device.

Preferably, the second data is stored in a form of a row data table consisting of a plurality of row data.

S103: Third data of the master device and third data of the slave device are generated according to the second data of the master device and the second data of the slave device, each third data comprising the second data and primary keys and characteristic values of the second data.

Wherein, the characteristic values may be verification values of parity verification codes, cyclic redundancy codes and Hamming code, etc. Preferably, the embodiments of the present disclosure are just described by taking the verification values of cyclic redundancy codes as characteristic values for example. The device analyzes the second data of the master device and the second data of the slave device, respectively, extracts the primary keys of the second data of the master device, and calculates the characteristic value of the row data in each row of the second data of the master device. The second data of the master device and the primary keys and characteristic values of the second data together form the third data of the master device. Meanwhile, the device extracts the primary keys of the second data of the slave device, and calculates the characteristic value of the row data in each row of the second data of the slave device. The second data of the slave device and the primary keys and characteristic values of the second data together form the third data of the slave device. The third data of the master device and the third data of the slave device are used for comparing the consistency of the data of both the master device and the slave device.

S104: The third data of the master device is compared with the third data of the slave device.

S105: Verification results are output.

When comparing the third data of the master device with the third data of the slave device, the device compares data row by row. The device compares whether the primary keys are identical at first, and then compares whether the characteristic values are identical in case that the primary keys are identical, and outputs inconsistent row data according to the results of comparison.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved.

Optionally, based on the technical solution as shown in FIG. 1a, S101, i.e., first data of the master device and first data of the slave device are acquired, respectively, each first data comprising a data file of a checkpoint and a log file, comprises S101a and S101b.

S101a: A control command carrying a transmission rate at which the master device and the slave device send the first data is sent to the master device and the slave device, respectively.

Wherein, the transmission rate may be set by default by the device, or determined by the master device, the slave device and the device through negotiation. Preferably, the transmission rate is associated to the performance of the master device and the slave device. The setting of the transmission rate may avoid the influence on outward services caused by the excessive occupancy of resources as both the master device and the slave device send the first data to the device.

S101b: The first data sent by the master device and the first data sent by the slave device are received.

The first data is sent by the master device and the slave device to the device in a form of a plurality of data packets, respectively. Therefore, the device receives the first data sent by both the master device and the slave device continuously until all the data files of the checkpoint and the log files of the master device and the slave device are sent.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved. The transmission rate at which the master device and the slave device send the first data may be controlled by carrying the transmission rate in the control command, so that it is ensured that the outward services of the device will not be influenced during the data verification.

Optionally, based on the technical solution as shown in FIG. 1a, the first data further comprises a disk read/write parameter; and correspondingly, S101a, i.e., a control command carrying a transmission rate at which the master device and the slave device send the first data is sent to the master device and the slave device, respectively, comprises the following steps of: adjusting the transmission rate according to the disk read/write parameter, and sending, to the master device and the slave device, the control command carrying the adjusted transmission rate at which the master device continues to send the first data of the master device and the slave device continues to send the first data of the slave device.

The device receives the first data sent by the master device and the first data sent by the slave device, acquires a first transmission rate according to the disk read/write parameter in the first data of the master device and a second transmission rate according to the disk read/write parameter in the first data sent by the slave device, compares the first transmission rate with the second transmission rate, and uses the smaller one of the two transmission rates as the transmission rate carried in the control command to be sent. The larger the disk read/write parameter in the first data received by the device is, the more the services of the device are. In this case, the device sets a small transmission rate for the first data in order to not influence the processing of normal services of the device. However, the smaller the disk read/write parameter in the first data received by the device is, the less the services of the device are. In this case, the device sets a large transmission rate for the first data in order to make full use of resources of the device. Therefore, preferably, the transmission rate of the first data is inversely proportional to a preset relation of the disk read/write parameter, for example, V=K/C, where K is a constant, C is the disk read/write parameter, and V is the transmission rate of the first data.

The device sends the control command to the master device and the slave device, respectively, so that the master device and the slave device continue to transmit the first data at the transmission rate carried in the control command.

In practices, the master device is primarily responsible for outward services, while the slave device is primarily responsible for the backup of data. Therefore, preferably, one significant concern is the disk read/write parameter of the master device. The transmission rate is determined only according to the disk read/write parameter in the first data of the master device. As the resource occupation rate of the master device is constantly changing when the master device performs outward services, the transmission rate of the first data may be increased when the disk read/write parameter indicates a low resource occupation rate. However, when the disk read/write parameter of the master device indicates a high resource occupation rate, the transmission rate of the first data is decreased.

As the services of the master device and the slave device are performed, the disk read/write parameter of the master device and the disk read/write parameter of the slave device are constantly changing. When receiving the first data continuously, the device may adjust the transmission rate carried in the control command in real time according to the change of the disk read/write parameter, so that the master device and the slave device change the transmission rate continuously to adapt to the change of the current services to avoid any influence on the services.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved. The transmission rate at which the master device and the slave device send the first data may be controlled by carrying the transmission rate in the control command, so that it is ensured that the outward services of the device will not be influenced during the data verification. Further, the device may adjust the transmission rate of the first data in real time by carrying the disk read/write parameter in the first data, thus the disk resources of the device may be utilized effectively.

Optionally, based on the technical solution as shown in FIG. 1a, S103, i.e., third data of the master device and third data of the slave device are generated according to the second data of the master device and the second data of the slave device, each third data comprising the second data and primary keys and characteristic values of the second data, comprises the following step of: traversing each row of the second data of the master device to extract the primary keys in the second data of the master device and calculating the characteristic value of each row of the second data of the master device according to the second data of the master device; and traversing each row of the second data of the slave device to extract the primary keys in the second data of the slave device and calculating the characteristic value of each row of the second data of the slave device according to the second data of the slave device.

The device traverses the second data of the master device and the second data of the slave device in row order, extracts the primary keys in the second data of the master device and the primary keys in the second data of the slave device, and calculates the characteristic value of the row data of each row of the master device and the characteristic value of the row data of each row of the slave device, respectively. Each row of the generated third data of the master device and the generated third data of the slave device comprises a primary key, row data and a characteristic value.

Preferably, the algorithm for calculating the characteristic values may be cyclic redundancy verification algorithm. Correspondingly, the characteristic values may be cyclic redundancy verification values.

Preferably, for the process of traversing, extracting and calculating, the table data files may be directly analyzed by an innodb engine to acquire the third data. The row data D of each row in the second data is traversed successively to extract the primary key P of each row and the characteristic value crc of the row data of each row is calculated By using the innodb engine. Data in each row in the acquired third data is stored in a form of <Primary Key P, Row Data D, crc>.

Wherein, the primary key refers to one or a plurality of fields in a table, and the value of the primary key is used for uniquely identifying one row data in the table.

Preferably, the third data may be stored in a form of a row data table consisting of a plurality of row data.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved. The transmission rate at which the master device and the slave device send the first data may be controlled by carrying the transmission rate in the control command, so that it is ensured that the outward services of the device will not be influenced during the data verification. Further, the device may adjust the transmission rate of the first data in real time by carrying the disk read/write parameter in the first data, thus the disk resources of the device may be utilized effectively. The generation of the third data is advantageous to improve the speed of data verification and the accuracy of verification.

Optionally, based on the technical solution as shown in FIG. 1a, S104, i.e., the third data of the master device is compared with the third data of the slave device to output verification results, comprises S104a, S104b and S104c.

S104a: It is determined whether the primary keys of corresponding row data in the third data of the master device and the third data of the slave device are identical.

The device determines whether the primary keys of corresponding row data in the third data of both the master device and the slave device are identical according to the acquired third data of the master device and the acquired third data of the slave device; if so, further compares the third data according to the characteristic values; and if not, outputs corresponding row data. As the third data is sorted according to the primary keys, the third data of both the master device and the slave device may be compared row by row in order. To describe the process of comparing the primary keys of corresponding row data in the third data of both the master device and the slave device, the process of comparing primary keys of corresponding row data in the third data of the master device as shown in Table 1 and the third data of the slave device as shown in Table 2 will be taken as an example for description.

TABLE 1

| Primary key | Row data | Characteristic value |
|---|---|---|
| 1 | 1, Xiao Wang, math, 2 | A |
| 2 | 2, Xiao Li, math, 3 | B |
| 3 | 3, Xiao Zhang, math, 8 | C |
| 4 | 4, Xiao Huang, math, 12 | D |
| 5 | 5, Xiao Zhao, math, 10 | E |

TABLE 2

| Primary key | Row data | Characteristic value |
|---|---|---|
| 1 | 1, Xiao Wang, math, 7 | A' |
| 2 | 2, Xiao Li, math, 3 | B |
| 4 | 4, Xiao Huang, math, 12 | D |

In Table 1 and Table 2, the third data of the master device and the third data of the slave device are listed, respectively. In the process of comparing the corresponding row data, according to the order of the primary keys, the primary key of the first row in Table 1 is compared with the primary key of the first row in Table 2 at first. Then, the primary key of the second row in Table 1 is compared with the primary key of the second row in Table 2. Subsequently, when the primary key of the third row in Table 1 is compared with the primary key of the third row in Table 2, as the primary keys of the third row of the two table are different, it is required to continue to compare the primary key of the fourth row in Table 1 with the primary key of the third row in Table 2. From this example, it can be known that the comparison of primary keys of corresponding row data of the third data of the master device and the third data of the slave device refers to the comparison of rows with same primary keys in the third data of the master device and the third data of the slave device.

S104b: The corresponding row data of both the master device and the slave device are output, respectively, if the primary keys of the corresponding row data in the third data of the master device and the third data of the slave device are identical and if the characteristic values of the corresponding row data in both the master device and the slave device are different.

When the primary keys of the corresponding row data in the third data of the master device and in the third data of the slave device are identical, it is required to compare whether other data other than primary keys in the row data are identical. As the characteristic values of the row data in the third data are calculated from the row data, the comparison of row data may be realized by comparing the characteristic values. The replacement of the compassion of row data with the comparison of characteristic values may quicken the comparison speed.

When the primary keys of the corresponding row data of both the master device and the slave device are identical and the characteristic values of corresponding row data of both the master device and the slave device are identical, the corresponding row data in the third data of both the master device and the slave device is consistent.

When the primary keys of the corresponding row data of both the master device and the slave device are identical and the characteristic values of corresponding row data of both the master device and the slave device are different, it is considered that the corresponding row data in the third data of both the master device and the slave device is different, and then the different row data is output.

Based on the example of S104a, at the beginning of comparing Table 1 with Table 2 in S104b, it is required to compare whether the characteristic value of the first row in Table 1 is identical to the characteristic value of the first row in Table 2 if the primary key of the first row in Table 1 and the primary key of the first row in Table 2 are identical. By comparison, it can be known that the characteristic value A of the first row in Table 1 is different from the characteristic value A' of the first row in Table 2. In this case, the row data of the first row in Table 1 and the row data of the first row in Table 2 are output, i.e., "1, Xiao Wang, math, 2" and "1, Xiao Wang, math, 7" are output. In this way, a user may know the inconsistent data in the master device and the slave device.

S104c: It is determined whether the primary key of the corresponding row data in the third data of the master device is greater than that of the corresponding row data in the third data of the slave device if the primary keys of the corresponding row data in the third data of the master device and the third data of the slave device are different; the corresponding row data in the third data of the slave device is output if the primary key of the corresponding row data in the third data of the master device is greater than that of the corresponding row data in the third data of the slave device; and, the corresponding row data in the third data of the master device is output if the primary key of the corresponding row data in the third data of the master device is less than that of the corresponding row data in the third data of the slave device.

If the primary keys of the corresponding row data in the third data of the master device and the third data of the slave device are different, for a one-to-one correspondence of primary keys in the subsequent comparison process, it is required to compare the primary keys in the third data of both the master device and the slave device, in order to determine whether or not to acquire the primary key of the next row for continuous comparison. If the primary key in the third data of the master device is greater than that in the third data of the slave device, it is indicated that the row data in the slave device does not exist in the master device; in this case, the row data is output. Meanwhile, the primary key of row data of the next row in the third data of the slave device is acquired to be compared with that of the row data of the current row in the third data of the master device. If the primary key in the third data of the master device is less than that in the third data of the slave device, it is indicated that the row data in the master device does not exist in the slave device; in this case, the row data is output. Meanwhile, the primary key of row data of the next row in the third data of the master device is acquired to be compared with that of the row data of the current row in the third data of the slave device.

Based on the example of S104a, in S104c, when the primary key of the third row in Table 1 is compared with that of the third row in Table 2, as the primary key of the third row in Table 1 is less than that of the third row in Table 2, it is required to output the row data of the third row in Table 1, i.e., output "3, Xiao Zhang, math, 8", and the primary key of row data of the next row in Table 1 is acquired to be compared with that of the row data of the third row in Table 2.

S104a-S104c show a specific comparison process in the data consistency verification. If the comparison of the third data of the master device or the slave device is completed, the whole comparison process ends, and the data of the master device or the slave device undergoing no comparison is output as inconsistent data. Based on the example of S104, at the end of comparison, it can be know that the data of the fifth row in Table 1 undergoes no comparison, so the row data of the fifth row in Table 1 is output.

Figure 1B:
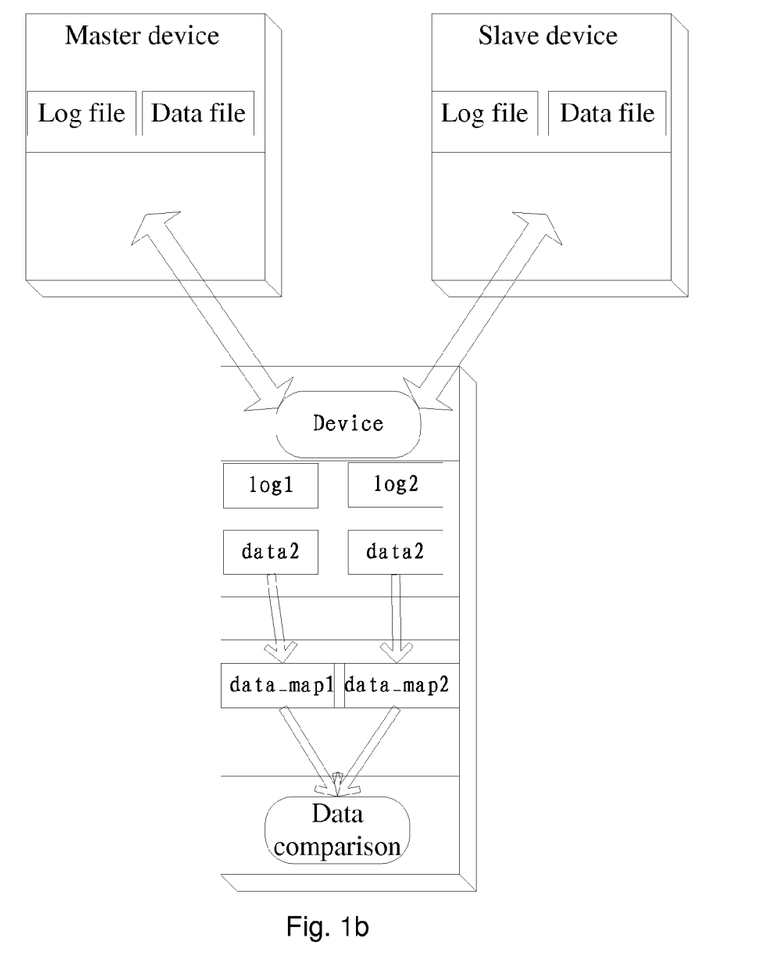
FIG. 1b is a schematic diagram of a method for verifying consistency of data of a master device and a slave device according to embodiments of the present disclosure.

To make this process better understood by those skilled in the art, FIG. 1b is a schematic diagram of a method for verifying consistency of data of a master device and a slave device according to embodiments of the present disclosure. Referring to FIG. 1b, the master device and the slave device send log (log file) and data (data file of the checkpoint) as the first data to the device. The device recovers data via a mechanism of crash recover, then generates the second data of the master device according to the received log1 and data1, and generates the second data of the slave device according log2 and data2. The device scans the second data of both the master device and the slave device row by row, and then generates a triple of primary keys, row data and cyclic redundancy verification values. This triple forms the third data (data_map1) of the master device and the third data (data_map2) of the slave device. After generating the third data, the device sequentially reads data_map1 and data_map2, and outputs the inconsistent data by comparison. The inconsistent data comprises: row data with consistent primary key values but inconsistent cyclic redundancy verification values, and row data with different primary key values.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved. The transmission rate at which the master device and the slave device send the first data may be controlled by carrying the transmission rate in the control command, so that it is ensured that the outward services of the device will not be influenced during the data verification. Further, the device may adjust the transmission rate of the first data in real time by carrying the disk read/write parameter in the first data, thus the disk resources of the device may be utilized effectively. The generation of the third data is advantageous to improve the speed of data verification and the accuracy of verification.

Figure 2:
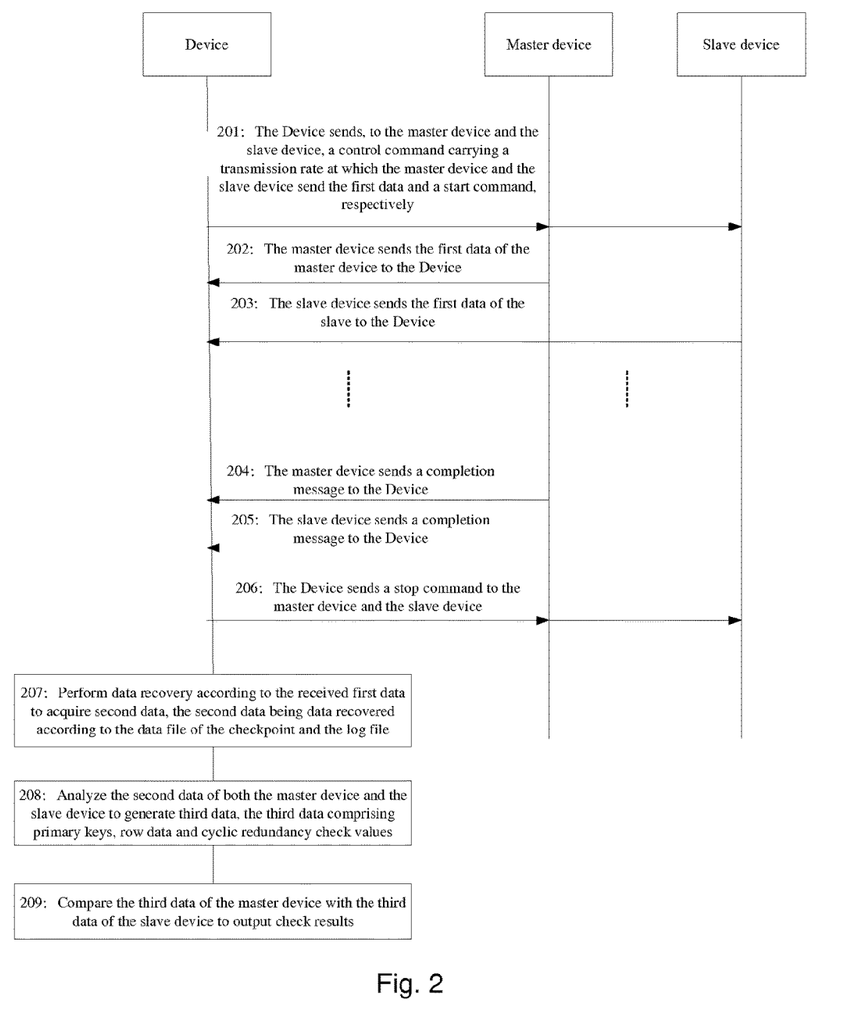
FIG. 2 is a flowchart of a method for verifying consistency of data of a master device and a slave device according to embodiments of the present disclosure.

FIG. 2 is a flowchart of a method for verifying consistency of data of a master device and a slave device according to embodiments of the present disclosure. The executive subject of the embodiment of the present disclosure is device. Referring to FIG. 2, the method comprises the following steps:

S201: The device sends a control command and a start command to the master device and the slave device, respectively, the control command carrying a transmission rate at which the master device and the slave device send the first data.

After starting the consistency data verification, the device sends a start command and a control command to the master device and a start command and a control command to the slave device, so that the master device and the slave device start the transmission of the first data according to the start command, and adjust the transmission rate of the first data according to the transmission rate carried in the control command.

S202: The master device sends the first data of the master device to the device.

Wherein, the first data of the master device comprises a data file and a log file. The data file is sent to the device via a main thread of the master device, while the log file is sent to the device via a redo log thread of the master device.

After receiving the start command sent by the device, the master device starts the main thread and the redo log thread. Wherein, the main thread is used for starting and stopping the redo log thread, and for sending the data file and a completion message to the device. The redo log thread is used for monitoring the change of redo log and sending the corresponding log file to the device. The redo log thread sends the log file to the device after receiving a start command from the main thread, and stops sending the change data of redo log after receiving a stop command from the main thread.

Moreover, the first data further comprises a disk read/write parameter which may be regarded as the basis for the device to adjust the transmission rate of the first data.

S203: The slave device sends the first data of the slave device to the device.

Wherein, the first data of the slave device comprises a data file and a log file. The data file is sent to the device via a main thread of the slave device, while the log file is sent to the device via a redo log thread of the slave device.

The operating principle of the main thread and the redo log thread of the slave device is the same as that of the master device, referring to S202, and will not be repeated here.

As there is no specific order for the master device and the slave device to send the first data to the device, there is no precedence relationship between S202 and S203.

Further, the transmission rate is adjusted according to the disk read/write parameter carried in the first data of the master device or the disk read/write parameter carried in the first data of the slave device, and the control command is sent to the master device and the slave device. The control command carries the adjusted transmission rate at which the master device and the slave device continue to send the first data.

Specifically, the device acquires a first transmission rate according to the disk read/write parameter carried in the first data of the master device and a second transmission rate according to the disk read/write parameter carried in the first data of the slave device, compares the two transmission rates, then uses the smaller one of the two transmission rates as the transmission rate, and sends a control command to the master device and the slave device. The control command carries the transmission rate.

During receiving the first data, the device adjusts the transmission rate in real time according to the disk read/write parameter carried in the first data, so that the master device and the slave device may transmit the first data faster without influencing outward services.

S204: The master device sends a completion message to the device.

After sending the data file of the checkpoint, the main thread of the master device sends a completion message to the device.

S205: The slave device sends a completion message to the device.

After sending the data file of the checkpoint, the main thread of the slave device sends a completion message to the device.

As there is no sequence for the master device and slave device to send completion messages, there is no specific order between S204 and S205.

S206: The device sends a stop command to the master device and the slave device.

After receiving the completion message sent by the master device and the completion message sent by the slave device, the device sends a stop command to the master device and the slave device, so that the master device and the slave device stops the main threads thereof according to the stop command, and then the main treads stop the redo log threads. So far, the sending of the first data ends.

S201-S206 show a process of acquiring the first data of both the master device and the slave device, wherein the first data comprises a data file of a checkpoint and a log file.

S207: Data is recovered according to the received first data to require second data of the master device and second data of the slave device, the second data being data recovered according to the data file of the checkpoint and the log file.

The first data of the master device and the first data of the slave device received by the device comprise the data file of the checkpoint and the log file recording operations after the checkpoint. Therefore, the first data may be restored to a data status before the master device and the slave device receive a stop command, i.e., the second data, according to the data file of the checkpoint and the log file in the first data.

In the embodiments of the present disclosure, preferably, the data file is recovered with the log file in the received first data by a mechanism of innodb crash recover, so that the first data is recovered to data before the master device and the slave device receive a stop command, and then the recovered data is used as the second data. Innodb crash recover refers that an innodb engine recovers data to data before the device receives a stop command via the log file after the system exits abnormally. The principle is relatively simple: as the log file records all data changes of innodb and these operations are repeatable, data may be recovered to a status before exit as long as the data is redone successively according to the log file.

S208: The second data of the master device and the second data of the slave device are analyzed to generate third data comprising primary keys, row data and cyclic redundancy verification values.

According to the second data of the master device, each row of the second data of the master device is traversed to extract the primary keys in the second data of the master device and the characteristic value of each row of the second data of the master device is calculated; and according to the second data of the slave device, each row of the second data of the slave device is traversed to extract the primary keys in the second data of the slave device and the characteristic value of each row of the second data of the slave device is calculated.

After acquiring the second data of the master device and the second data of the slave device, the device traverses the second data in row order. The second data is sorted according to the primary keys, so the second data has a consistent directionality. If the primary keys are student numbers, the student numbers are sorted like 1, 2, 3, 4, . . . , i.e., sorted in the order of smallest to largest. Each row data in the third data is in a form of <Primary key, Row data, Characteristic value>. Preferably, the third data is stored in a form of table. By traversing, extracting and calculating the second data, two tables may be obtained, one of which is a third data table of the master device while the other one is a third data table of the slave device.

S209: The third data of the master device is compared with the third data of the slave device to output verification results.

It is determined whether primary keys of corresponding row data in the third data of the master device and the third data of the slave device are identical.

According to the generated third data table of the master device and the generated third data table of the slave device, it is determined successively whether the primary keys of corresponding row data in tables are identical. As a primary key is unique for the object described by each row in the tables, i.e., the primary key of each row is distinct, the comparison of the primary keys may quicken the efficiency of comparison.

If the primary keys of corresponding row data in the third data of the master device and the third data of the slave device are identical and if the characteristic values of corresponding row data of both the master device and the slave device are different, the corresponding row data of both the master device and the slave device are output, respectively.

If the primary keys of corresponding row data in the third data of the master device and the third data of the slave device are identical, it is indicated that data of a same object is compared. For example, when the primary keys are student numbers, the primary key value of the master device is 1 and the primary key value of the slave device is 1, it is indicated that the object in both the master device and the slave device is a student whose student number is 1. After the object for comparison is determined to be the same, it is required to further compare other data of the object. In this case, it will be known whether other data are identical just by comparing the characteristic values.

In the process of comparing characteristic values of corresponding row data of both the master device and the slave device, if the characteristic values of corresponding row data of both the master device and the slave device are identical, it is considered that the row data in the third data of both the master device and the slave device is identical, i.e., the row data of both the master device and the slave device is consistent; and if the characteristic values of corresponding row data of both the master device and the slave device are different, it is considered that the row data in the third data of both the master device and the slave device is different, i.e., the row data of both the master device and the slave device is inconsistent, in this case, the device outputs the inconsistent row data.

If the primary keys of corresponding row data in the third data of the master device and the third data of the slave device are different, it is determined whether the primary key of the corresponding row data in the third data of the master device is greater than that of the corresponding row data in the third data of the slave device; if the primary key of the corresponding row data in the third data of the master device is greater than that of the corresponding row data in the third data of the slave device, the corresponding row data in the third data of the slave device is output; and if the primary key of the corresponding row data in the third data of the master device is less than that of the corresponding row data in the third data of the slave device, the corresponding row data in the third data of the master device is output.

If the primary keys in the third data of the master device and the third data of the slave device are different, it is indicated that the currently compared row data in the third data of the master device or the slave device exists in one device but not in the other device. In this case, it is required to find out data not exist in the other device, and the data is the inconsistent data. Therefore, the device needs to further determine whether the primary key in the third data of the master device is greater than that in the third data of the slave device in order to find out the inconsistent data.

If the primary key in the third data of the master device is greater than that in the third data of the slave device, it is indicated that the currently compared row data in the third data of the slave device does not exist in the master device, and the row data is the inconsistent data. The row data in the third data of the slave device is output. If the primary key in the third data of the master device is less than that in the third data of the slave device, it is indicated that the currently compared row data in the third data of the master device does not exist in the slave device, and the row data is the inconsistent data. The row data in the third data of the master device is output.

After comparing the third data of the mater device or the third data of the slave device, if there is still row data undergoing no comparison in the master device or the slave device, the row data is output as inconsistent data.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the technical solutions provided by the present disclosure, the influence on the outward services of the master device is avoided by acquiring the data file of the checkpoint and the log file; and by the comparison of the third data, the process of online consistency verification is quickened and the accuracy of verification is improved. The transmission rate at which the master device and the slave device send the first data may be controlled by carrying the transmission rate in the control command, so that it is ensured that the outward services of the device will not be influenced during the data verification. Further, the device may adjust the transmission rate of the first data in real time by carrying the disk read/write parameter in the first data, thus the disk resources of the device may be utilized effectively. The generation of the third data is advantageous to improve the speed of data verification and the accuracy of verification.

Figure 3:
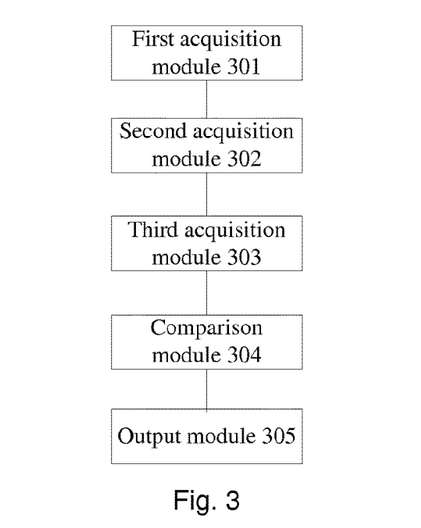
FIG. 3 is a structure diagram of a device for verifying consistency of data of a master device and a slave device according to embodiments of the present disclosure.

FIG. 3 is a structure diagram of a device for verifying consistency of data of a master device and a slave device according to embodiments of the present disclosure. Referring to FIG. 3, the device comprises:

a first acquisition module 301, configured to acquire first data of the master device and first data of the slave device, respectively, each first data comprising a data file of a checkpoint and a log file;

a second acquisition module 302, configured to recover data according to the received first data of the master device and the received first data of the slave device respectively to acquire second data of the master device and second data of the slave device, each second data being data recovered according to the data file of the checkpoint and the log file;

a third acquisition module 303, configured to generate third data of the master device and third data of the slave device according to the second data of the master device and the second data of the slave device, each third data comprising the second data and at least one primary key and characteristic values of the second data;

a comparison module 304, configured to compare the third data of the master device with the third data of the slave device; and an output module 305, configured to output verification results.

The first acquisition module 301 comprises:

a sending unit, configured to send, to the master device and the slave device, a control command carrying a transmission rate at which the master device and the slave device send the first data, respectively; and a receiving unit, configured to receive the first data sent by the master device and the first data sent by the slave device.

The first data further comprises a disk read/write parameter; and correspondingly, the sending unit is further configured to adjust the transmission rate according to the disk read/write parameter, and send, to the master device and the slave device, the control command carrying the adjusted transmission rate at which the master device continues to send the first data of the master device and the slave device continues to send the first data of the slave device.

The third acquisition module 303 is configured to traverse each row of the second data of the master device to extract the primary keys in the second data of the master device and calculate the characteristic value of each row of the second data of the master device according to the second data of the master device; and the third acquisition module 303 is further configured to traverse each row of the second data of the slave device to extract the primary keys in the second data of the slave device and calculate the characteristic value of each row of the second data of the slave device according to the second data of the slave device.

The comparison module 304 comprises:

a judgment unit, configured to determine whether the primary keys of corresponding row data in the third data of the master device and the third data of the slave device are identical; and an output unit, configured to output the corresponding row data of both the master device and the slave device, respectively, if the primary keys of corresponding row data in the third data of the master device and the third data of the slave device are identical and if the characteristic values of the corresponding row data in the third data of both the master device and the slave device are different;

the judgment unit is further configured to determine whether the primary key of the corresponding row data in the third data of the master device is greater than that of the corresponding row data in the third data of the slave device if the primary keys of the corresponding row data in the third data of the master device and the third data of the slave device are different; and the output unit is further configured to output the corresponding row data in the third data of the slave device if the primary key of the corresponding row data in the third data of the master device is greater than that of the corresponding row data in the third data of the slave device, and output the corresponding row data in the third data of the master device if the primary key of the corresponding row data in the third data of the master device is less than that of the corresponding row data in the third data of the slave device.

In the present disclosure, first data of both the master device and the slave device is acquired, the first data comprising a data file of a checkpoint and a log file; data is recovered according to the received first data to acquire second data, the second data being data recovered according to the data file of the checkpoint and the log file; third data is generated according to the second data of both the master device and the slave device, the third data comprising the second data and primary keys and characteristic values of the second data; and, the third data of the master device is compared with the third data of the slave device to output verification results. By the device provided by the present disclosure, the influence on the outward services of the master device is avoided by acquiring the data file of the checkpoint and the log file; and by the comparison of the third data, the process of online consistency verification is quickened and the accuracy of verification is improved. The transmission rate at which the master device and the slave device send the first data may be controlled by carrying the transmission rate in the control command, so that it is ensured that the outward services of the device will not be influenced during the data verification. Further, the device may adjust the transmission rate of the first data in real time by carrying the disk read/write parameter in the first data, thus the disk resources of the device may be utilized effectively. The generation of the third data is advantageous to improve the speed of data verification and the accuracy of verification.

It is to be noted that, when the verification device provided by the above embodiments performs data verification, the division of the above all functional modules is just illustrative. In practices, the above functions may be distributed to different functional modules as required, i.e., the internal structure of the device may be divided into different functional modules to implement all or a part of functions described above. In addition, the verification device provided by the above embodiments and the method for verifying consistency of data of a master device and a slave device are of a same conception, and the specific implementation process of the verification device refers to the embodiments of the method and will not be repeated here.

Figure 4:
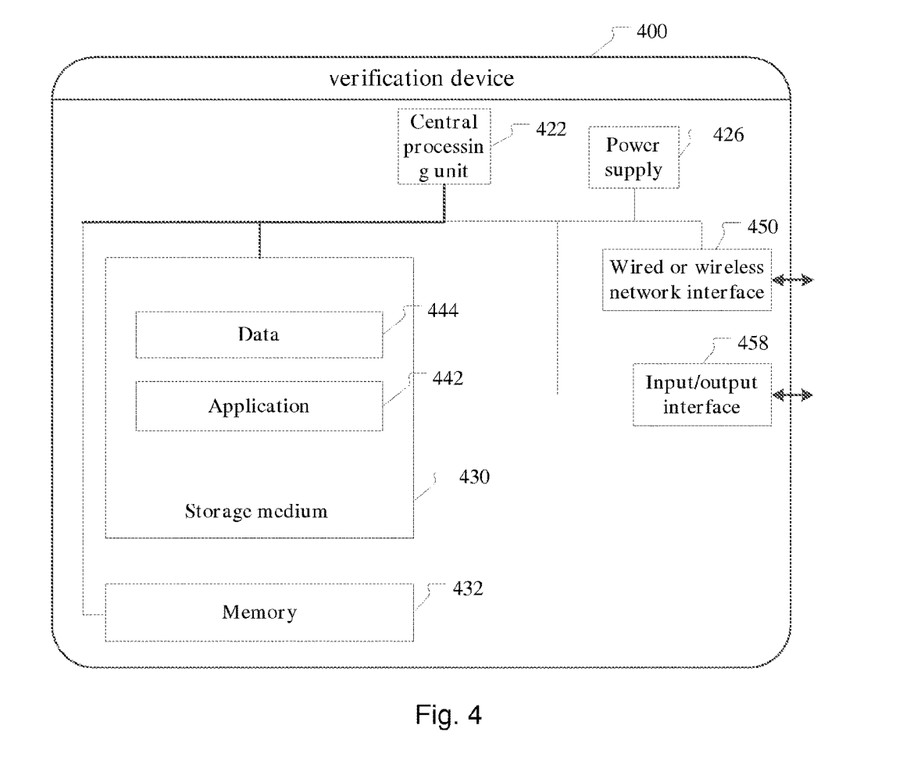
FIG. 4 is a schematic diagram of a verification device according to embodiments of the present disclosure.

The device mentioned in FIG. 1 and FIG. 2 may be on the basis of the following structure. FIG. 4 is a structure diagram of verification device according to embodiments of the present disclosure. The verification device 400 mentioned herein may have a significant difference on different configuration or performance, and may include one or more central processing units (CPU) 422 (for example, one or more processors) and memories 432 and one or more storage media 430 (for example, one or more mass storage devices) for storing applications 442 or data 444, wherein the memory 432 and the storage medium 430 may support temporary storage or persistent storage. Applications stored in the storage medium 430 may include one or more modules (not shown), each of which may contain a series of instruction for instructing operations to the device. Further, the central processing unit 422 may be configured to communicate with the storage medium 430 in order to execute in the verification device 400 a series of operation instructions stored in the storage medium 430. The verification device 400 may further include one or more power supplies 426, one or more wired or wireless network interfaces 450, and one or more input/output interfaces 458.

The sequence numbers of the embodiments of the present disclosure are provided just for a purpose of description, and do not represent the priority of the embodiments.

A person of ordinary skill in the art may understand that all or a part of the steps of the foregoing embodiments may be implemented by hardware or a program instructing related hardware. The program may be stored in a computer readable storage medium. The storage medium may be a read-only memory, a magnetic disk, an optical disk, etc.

The foregoing descriptions are merely preferred embodiments of the present disclosure, and are not intended to limit the present disclosure. Any modification, equivalent replacement and improvement made within the spirit and principle of the present disclosure shall fall into the protection scope of the present disclosure.

The invention claimed is:

1. A method for verifying consistency of data of a master device and a slave device, executed by a device with verification function, and comprising the following steps of:

acquiring by the device with verification function, first data of the master device and first data of the slave device, respectively, each first data comprising a data file of a checkpoint and a log file;

recovering data by the device with verification function, according to the received first data of the master device and the received first data of the slave device respectively to acquire second data of the master device and second data of the slave device, each second data being recovered according to the data file of the checkpoint and the log file;

generating by the device with verification function, third data of the master device and third data of the slave device according to the second data of the master device and the second data of the slave device, each third data comprising the second data and at least one primary key and characteristic values of the second data, wherein the third data of the master device and the third data of the slave device are both stored in a form of a row data table consisting of a plurality of rows, the primary key refers to one or a plurality of fields in the table, and the primary key is used for uniquely identifying one row data in the table;

comparing row by row by the device with verification function, the third data of the master device with the third data of the slave device; and outputting by the device with verification function, verification results;

comparing row by row by the device with verification function, the third data of the master device with the third data of the slave device comprises the following steps of:

determining by the device with verification function, whether the primary keys of corresponding row data in the third data of the master device and the third data of the slave device are identical;

outputting by the device with verification function, the corresponding row data of both the master device and the slave device, respectively, if the primary keys of the corresponding row data in the third data of the master device and the third data of the slave device are identical and the characteristic values of the corresponding row data of both the master device and the slave device are different;

determining by the device with verification function, whether the primary key of the corresponding row data in the third data of the master device is greater than that of the corresponding row data in the third data of the slave device if the primary keys of the corresponding row data in the third data of the master device and the third data of the slave device are different;

outputting by the device with verification function, the corresponding row data in the third data of the slave device if the primary key of the corresponding row data in the third data of the master device is greater than that of the corresponding row data in the third data of the slave device; and outputting by the device with verification function, the corresponding row data in the third data of the master device if the primary key of the corresponding row data in the third data of the master device is less than that of the corresponding row data in the third data of the slave device.

2. The method according to claim 1, wherein acquiring first data of the master device and first data of the slave device respectively comprises the following steps of:

sending, to the master device and the slave device, a control command carrying a transmission rate at which the master device and the slave device send the first data, respectively; and receiving the first data sent by the master device and the first data sent by the slave device.

3. The method according to claim 2, wherein the first data further comprises a disk read/write parameter; and correspondingly, sending, to the master device and the slave device, a control command carrying a transmission rate at which the master device and the slave device send the first data, respectively, comprises the following steps of:

adjusting the transmission rate according to the disk read/write parameter, and sending, to the master device and the slave device, the control command carrying the adjusted transmission rate at which the master device continues to send the first data of the master device and the slave device continues to send the first data of the slave device.

4. The method according to claim 1, wherein generating third data of the master device and third data of the slave device according to the second data of the master device and the second data of the slave device comprises the following step of:

traversing each row of the second data of the master device to extract the primary keys in the second data of the master device and calculating the characteristic value of each row of the second data of the master device according to the second data of the master device; and traversing each row of the second data of the slave device to extract the primary keys in the second data of the slave device and calculating the characteristic value of each row of the second data of the slave device according to the second data of the slave device.

5. The method according to claim 1, wherein, the characteristic values are verification values of parity verification codes, cyclic redundancy codes and Hamming code.

6. A device for verifying consistency of data of a master device and a slave device, comprising a processor and a memory, wherein the processor is configured to:

acquire first data of the master device and first data of the slave device, respectively, each first data comprising a data file of a checkpoint and a log file;

recover data according to the received first data of the master device and the received first data of the slave device respectively to acquire second data of the master device and second data of the slave device, each second data being data recovered according to the data file of the checkpoint and the log file;

generate third data of the master device and third data of the slave device according to the second data of the master device and the second data of the slave device, each third data comprising the second data and at least one primary key and characteristic values of the second data, wherein the third data of the master device and the third data of the slave device are both stored in a form of a row data table consisting of a plurality of rows, the primary key refers to one or a plurality of fields in the table, and the primary key is used for uniquely identifying one row data in the table;

compare the third data of the master device with the third data of the slave device row by row; and output verification results;

wherein, comparing the third data of the master device with the third data of the slave device row by row comprises:

determine whether the primary keys of corresponding row data in the third data of the master device and the third data of the slave device are identical; and output the corresponding row data of both the master device and the slave device, respectively, if the primary keys of corresponding row data in the third data of the master device and the third data of the slave device are identical and if the characteristic values of the corresponding row data in the third data of both the master device and the slave device are different;

determine whether the primary key of the corresponding row data in the third data of the master device is greater than that of the corresponding row data in the third data of the slave device if the primary keys of the corresponding row data in the third data of the master device and the third data of the slave device are different; and output the corresponding row data in the third data of the slave device if the primary key of the corresponding row data in the third data of the master device is greater than that of the corresponding row data in the third data of the slave device, and output the corresponding row data in the third data of the master device if the primary key of the corresponding row data in the third data of the master device is less than that of the corresponding row data in the third data of the slave device.

7. The device according to claim 6, wherein the processor is configured to:

send, to the master device and the slave device, a control command carrying a transmission rate at which the master device and the slave device send the first data, respectively; and receive the first data sent by the master device and the first data sent by the slave device.

8. The device according to claim 7, wherein the first data further comprises a disk read/write parameter; and correspondingly, the processor is configured to adjust the transmission rate according to the disk read/write parameter, and send to the master device and the slave device the control command carrying the adjusted transmission rate at which the master device continues to send the first data of the master device and the slave device continues to send the first data of the slave device.

9. The device according to claim 6, wherein the processor is configured to:

traverse each row of the second data of the master device to extract the primary keys in the second data of the master device and calculate the characteristic value of each row of the second data of the master device according to the second data of the master device; and traverse each row of the second data of the slave device to extract the primary keys in the second data of the slave device and calculate the characteristic value of each row of the second data of the slave device according to the second data of the slave device.

10. The device according to claim 6, wherein, the characteristic values are verification values of parity verification codes, cyclic redundancy codes and Hamming code.

* * * * *